United States Patent
Kaifesh

[11] 3,983,633
[45] Oct. 5, 1976

[54] LEAD CHECKING GAGE
[76] Inventor: Cass Kaifesh, Anaheim, Calif.
[22] Filed: Aug. 14, 1973
[21] Appl. No.: 388,104

[52] U.S. Cl. ............................................. 33/199 R
[51] Int. Cl.² .......................................... G01B 3/00
[58] Field of Search ........ 33/199 R, 199 B, 179.5 E, 33/147 M, 179.5 B, 174 PA, 174 L, 203.11

[56] References Cited
UNITED STATES PATENTS

| | | | |
|---|---|---|---|
| 1,904,130 | 4/1933 | Garms et al. | 33/199 B |
| 2,476,189 | 7/1949 | Guetzkow | 33/199 R |
| 3,082,538 | 3/1963 | Theuerkauf | 33/199 R |

FOREIGN PATENTS OR APPLICATIONS

| | | | |
|---|---|---|---|
| 836,712 | 4/1952 | Germany | 33/199 B |

Primary Examiner—Richard E. Aegerter
Assistant Examiner—Steven L. Stephan
Attorney, Agent, or Firm—Gordon L. Peterson

[57] ABSTRACT

A gage for checking at least one characteristic of the threads of a threaded member comprising a supporting structure, and a carriage including first and second elements mounted for movement on the supporting structure. The threaded member is mounted on the supporting structure. A standard member having a standard surface defining precisely the characteristic which is to be checked is also mounted on the supporting structure. One of the members is mounted for movement. The first and second elements are adapted to cooperate with the threads of the threaded member and the standard surface of the standard member, respectively. Movement of the movable member provides an indication of the characteristic of the threads which is to be measured.

12 Claims, 5 Drawing Figures

U.S. Patent  Oct. 5, 1976  3,983,633
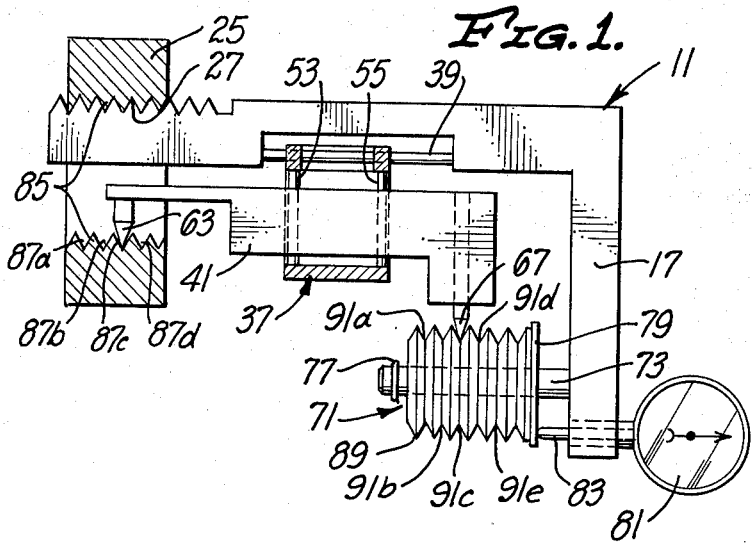
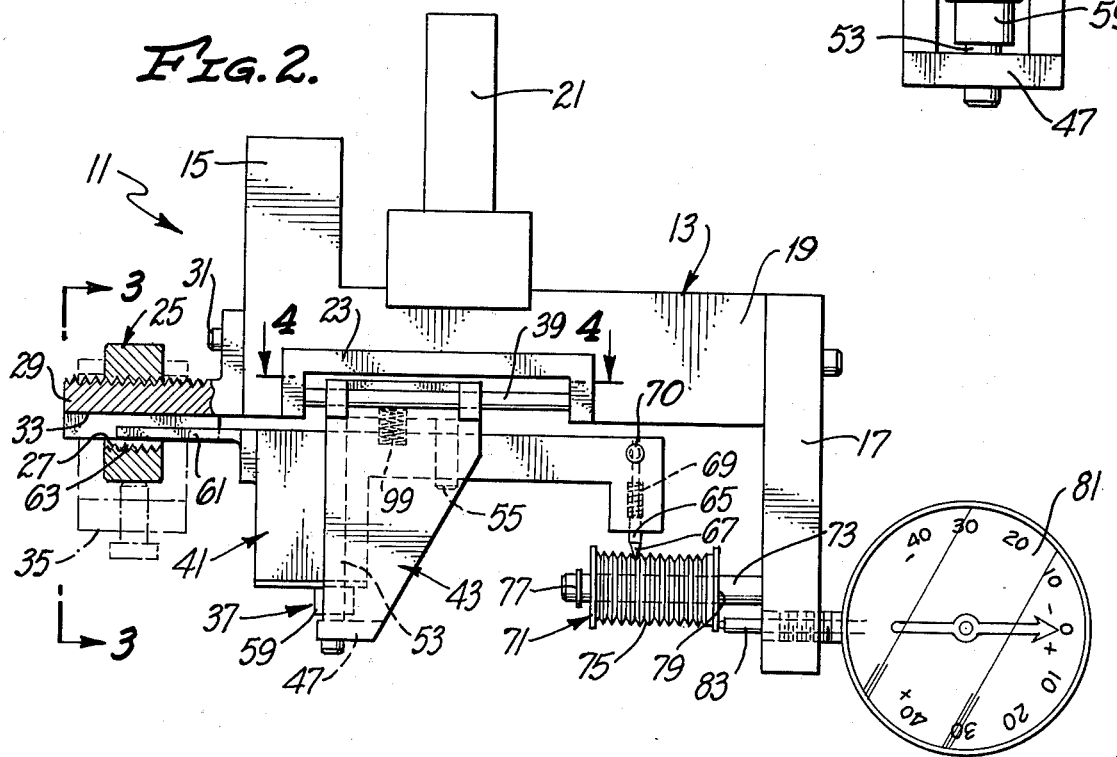
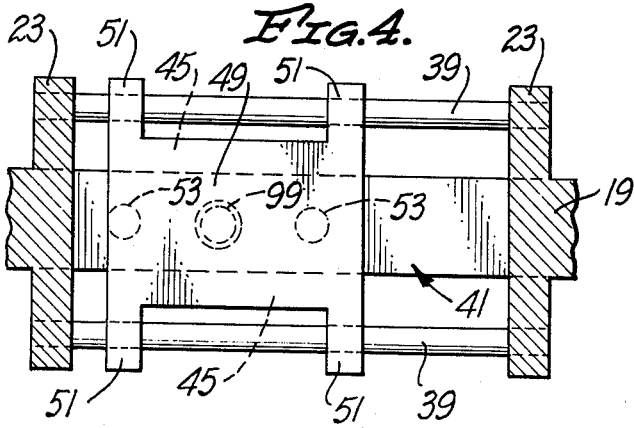
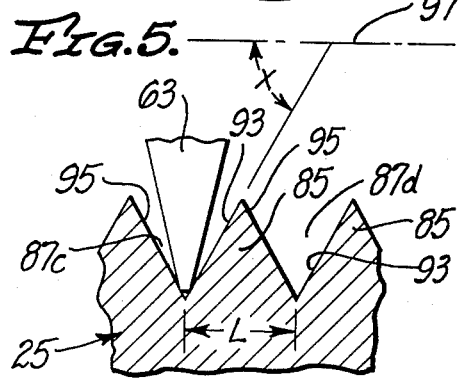

LEAD CHECKING GAGE

BACKGROUND OF THE INVENTION

Before using threaded precision parts, it is necessary to check various characteristics of the threads such as, for example, lead error, pitch diameter, and major diameter. As is well known, "lead" is the axial distance between the centers of adjacent grooves, and "lead error" is the variance between the actual lead and the true lead, i.e., the lead of perfect threads. If the lead error is too great, the threads are unacceptable.

Lead error is difficult to check or measure. Some prior art gages check lead error directly. Unfortunately, however, these gages are expensive and complex. Other prior art gages do not check lead or lead error directly. Rather, an effort to check lead error is made by determining whether or not certain specially designed thread elements seat to a proper depth in the threads.

One problem with this technique is that a failure of the threaded element to seat a proper depth in the threads may be caused by thread characteristics other than lead error. Thus, this prior art technique may indicate that the lead error is outside acceptable tolerances when, in fact, the lead error is within those tolerances.

Conversely, compensating errors may cause the threaded elements to seat an acceptable depth in the threads even though the lead error may be outside the allowable tolerances. Thus, with prior art techniques, compensating errors can mask or partially mask lead error.

SUMMARY OF THE INVENTION

The present invention solves these problems by providing a gage of simple construction which checks lead directly rather than by checking other thread characteristics. As lead is checked directly, it is much less likely that other thread characteristics will cause a false indication of lead error. Similarly, compensating errors will not mask or partially mask lead error.

With the present invention, the lead of a thread to be checked is directly compared with a standard. Any lead error can be directly on an indicator, thus obviating calculations and the likelihood of human error inherent in making such calculations. Although a gage constructed in accordance with the teachings of this invention has substantial advantages in checking lead error, it can be utilized to check other thread characteristics such as the angle or slope of the threads.

In accordance with this invention, a threaded member having threads to be checked is suitably mounted on a supporting structure. The threads to be checked may be either internal or external. A standard is also mounted on the supporting structure. The standard has a standard surface defining precisely a characteristic which is to be checked. Such standard surface can advantageously take the form of perfectly shaped annular grooves.

To compare the threads of the threaded member with the standard surface of the standard, a carriage is mounted on the supporting structure for movement relative thereto. The carriage has first and second elements for cooperating with the threads and the standard surface, respectively.

In order to provide an output indicative of the characteristic to be checked, at least one of the threaded members and the standard member must be mounted for movement on the supporting structure. Although either of these members could be movably mounted, it is usually easier to movably mount the standard. An indicator is mounted on the supporting structure and adapted to be driven by movement of the movable member.

To check a characteristic of the threads, first and second elements carried by the carriage are engaged with the threads and the standard surface, respectively, and the indicator is zeroed. To check the lead, the carriage is moved to index the first element into the next groove of the threads and the second element into the next groove of the standard surface. The standard will be moved to the extent of the lead error, and the indicator will provide a direct reading thereof. Other characteristics of the threads can be checked as described hereinbelow.

Another feature of the invention is that the second element, i.e., the one which engages the standard surface, is movably mounted relative to the standard, and biased toward engagement with the standard. This assures that the second element will always be in proper seating contact with the standard surface.

To facilitate the conduction of a thread angle test as described more particularly hereinbelow, it is necessary that the second element be accurately movable out of the groove of the standard surface in a predetermined manner. To prevent the second element from remaining in the groove of the standard surface under these circumstances, the present invention provides releasable means for fixing the second element relative to the carriage.

To facilitate cooperation between the first and second elements and the threads and standard surface, respectively, the carriage includes first and second carriage sections. The first carriage section is mounted on the supporting structure for movement along a first path, and the second carriage section is mounted for movement on the first carriage section along a second path which is generally transverse to the first path. The first and second elements are carried by the second carriage section. To facilitate use of the gage in various orientations, the second carriage section is urged in a direction so as to cause engagement of the first and second elements with the threads and standard surface, respectively. This urging means can include a spring.

The invention can best be understood by reference to the following description taken in connection with the accompanying illustrative drawing.

BRIEF DESCRIPTION OF THE DRAWING

FIG. 1 is a simplified, somewhat schematic, elevational view of a gage constructed in accordance with the teachings of this invention. FIG. 1 is useful primarily to understand the basic concept and operation of the gage rather than its specific construction.

FIG. 2 is a side elevational view, partially in section, of a gage constructed in accordance with the teachings of this invention.

FIG. 3 is an enlarged, fragmentary, and elevational view taken generally along line 3—3 of FIG. 2, with the releasable clamp omitted.

FIG. 4 is a fragmentary sectional view taken generally along line 4—4 of FIG. 2.

FIG. 5 is an enlarged, fragmentary sectional view of a section of the threads of the threaded member.

DESCRIPTION OF THE PREFERRED EMBODIMENT

FIGS. 2–4 show a gage 11 constructed in accordance with the teachings of this invention. The gage 11 includes a supporting structure 13 of metal or other sturdy material. The supporting structure 13 includes a pair of legs 15 and 17 at the opposite ends of the supporting structure, and a web in the form of a bar 19 interconnecting the legs. A mounting bracket 21 is suitably attached to the leg 19 to facilitate mounting of the gage 11 on a stand (not shown) or other supporting device which, if desired, may be considered as a portion of the supporting structure 13. The supporting structure 13 also includes a channel 23 mounted in a cut-out in the bar 19 and opening downwardly. The various portions of the supporting structure 13 may consist of one or more separate pieces. The form of the supporting structure 13 illustrated in the drawings is purely illustrative, and many other forms of supporting structures may be employed.

The gage 11 is adapted to check certain characteristics of a threaded member such as the nut 25. The nut 25 has internal threads 27. Although the threads 27 are internal, the gage 11 may also be used to check certain characteristics of external threads.

The nut 25 may be mounted on the supporting structure 13 utilizing various devices. However, in the embodiment illustrated, this function is accomplished by a screw 29 which is attached to the leg 15 by one or more screws 31. The leg 15 may have a plurality of screw-receiving apertures therein to permit the screw 29, and hence the nut 25, to be mounted at various positions along the leg 15. The screw 29 has an axial slot 33 formed therein which provides access to a region of the internal threads 27.

The nut 25 is attached to the screw 29 by the threads 27. If desired, a suitable releasable clamp 35 (shown in dashed lines in FIG. 2) may be employed to prevent relative rotation between the nut 25 and the screw 29, thereby assuring that the nut is fixed in position relative to the supporting structure 13.

A carriage 37 is mounted for movement on the supporting structure 13, for movement relative to the supporting structure along a predetermined path. Although various mounting techniques could be employed, in the embodiment illustrated, the carriage 37 is mounted on the supporting structure 13 by a pair of spaced, parallel shafts 39, the axes of which are parallel to the path along which the carriage 37 is movable. The opposite ends of the shafts are appropriately secured to the opposite ends or flanges of the channel 23. The shafts 39 extend generally transverse to the threads 27 and axially of the nut 25.

The carriage 37 includes a first carriage section 41 and a second carriage 43. The carriage section 43 includes spaced, parallel sidewalls 45 (FIG. 3), a bottom wall 47, and an upper wall 49 (FIG. 4). The upper wall 49 includes four bearings in the form of flanges 51 which slidably receive the shafts 39 to thereby accurately mount the carriage 37 for movement. The carriage section 43 constitutes, in the embodiment illustrated, a generally rectangular hollow member which mounts the entire carriage 37 for movement along the shafts 39. However, the carriage section 43 could be of various different configurations.

Another function of the carriage section 43 is to mount the carriage section 41 for movement along a path which is perpendicular to the axes of the shafts 39. With reference to FIG. 2, the entire carriage 37 is mounted for horizontal movement by the shafts 39. The carriage section 41 is mounted for vertical movement relative to the supporting structure 13 and the carriage section 43 by horizontally-spaced vertical shafts 53 and 55, which are in turn carried by the carriage section 43. The shaft 53 is attached at its opposite ends to the bottom wall 47 and to the upper wall 49. The shaft 55 is attached to the upper wall 49 and terminates in a free lower end as shown in FIG. 2. The shafts 53 and 55 are perpendicular to the plane defined by the shafts 39.

The carriage section 41 has passages therein which slidably receive the shafts 53 and 55, respectively. Downward movement of the carriage section 41 is limited by a stop 59 (FIG. 3), which is engageable with the upper surface of the bottom wall 47.

A finger 61 is attached to the carriage section 41 in any suitable manner such as by one or more screws (not shown). The finger 61 can be attached to the carriage section 41 at several different locations along the carriage 41. The finger 61 is elongated and is adapted to the received within the slot 33 of the screw 29. A thread-engaging element 63, which is adapted to cooperate with the thread 27 of the nut 25 is suitably attached to the finger 61. The element 63 may be of various known constructions such as, for example, a ball, a cone, or a relieved cone. The element 63 is preferably constructed so that the portion thereof which engages the threads 27 is receivable entirely within a single groove of the threads 27. This permits the surfaces defining each of the grooves of the threads 27 to be checked separately.

A pin 65, having a thread-engaging element 67 on the lower end thereof, is mounted for vertical movement at the end of the carriage opposite the finger 61. A spring 69 carried by the carriage section 41 urges the thread-engaging element 67 downwardly. A thumbscrew 70 is attached to the carriage section 41 and is adapted to lock the pin 65 and the thread-engaging element 67 is any one of a plurality of vertical positions relative to the carriage section 41.

The thread-engaging elements 63 and 67 are spaced from each other in the direction of movement of the entire carriage 37, i.e., in a direction parallel to the shafts 39. The thread-engaging element 67 is movable in a direction parallel to the shafts 53 and 55; however, the elements 63 and 67 are fixed relative to each other in a direction parallel to the shafts 39.

A standard 71 is mounted on the leg 17 by a shaft 73. The standard 71 has a standard surface on the exterior thereof which defines precisely at least one true characteristic of the thread 27, i.e., a characteristic which the thread 27 would have if it were perfectly constructed. Although this standard surface could be of various configurations, there arae advantages, as set forth hereinbelow, to having the standard surface define perfectly constructed annular grooves 75. The grooves 75 are not helical, and thus do not form screw threads. Rather, each of the grooves 75 is circular and defines a plane perpendicular to the axis of the shaft 73. The axial cross sections of the threads 27 and the standard surface will be identical if the former is perfectly sized and shaped.

The thread-engaging element 67 may be of any type which will cooperate with the threads 75 to allow accurate measurement of a characteristic of the threads 27.

For example, the element 67 may be of any of the types referred to above for the element 63.

The standard 71, in this embodiment, is annular and is slidably mounted on the shaft 73 for horizontal movement parallel to the shaft 39, and perpendicular to the shafts 53 and 55. The shaft 73 lies in the same plane as the parallel shafts 53 and 55. The shaft 73 is parallel to the finger 61 and the shafts 39, and is perpendicular to the shafts 53 and 55, and to the pin 65. A retainer 77 prevents the standard 71 from falling off the outer end of the shaft 73. The standard 71 is also rotatable on the shaft 73; however, rotation of the standard is not required.

The standard 71 has a driving surface in the form of a flat, planar end face 79. The end face 79 lies in a vertical plane perpendicular to the shaft 73.

An indicator 81, which may be of conventional construction, is mounted on the leg 17. The indicator 81 has a pin 83 which is spring-loaded to the left (as viewed in FIG. 2) into engagement with the end face 79. The indicator 81 provides a visual reading of the distance and direction of movement of the standard 71 in a direction parallel to the axis of the shaft 73.

The operation of the gage 11 can best be understood by reference to FIG. 1, which is a schematic, rather than an accurate structural, illustration of the gage. The thumbscrew 71 is loosened to allow the spring 69 to urge the element 67 downwardly toward the standard 71. From FIGS. 1 and 5 it can be seen that the threads 27 of the nut 25 include a series of crests or teeth 85 and valleys or grooves 87a–87d. The lead is the axial distance L (FIG. 5) between the bottoms of adjacent grooves 87. Similarly, the standard 71 includes a series of crests 89 and grooves 91a–91e. As shown in FIG. 1, the elements 63 and 67 are seated in the grooves 87c and 91c, respectively. The pin 83 of the indicator 81 is engaging the end face 79. The standard 71 is spaced from the retainer 77 and from the leg 17 so that the standard can be moved along the shaft 73 in either direction. With the components thus arranged, the gage 81 can be manually zeroed.

Assuming that it is desired to check the lead of the threads 27, the carriage section 41 is raised along the shafts 53 and 55 to remove the elements 63 and 67 from the grooves 87c and 91c, respectively. With the elements 63 and 67 out of their respective grooves, the carriage 37 is moved to the right (as viewed in FIGS. 1 and 3) along the shafts 39 sufficiently to position the elements 63 and 67 directly above the grooves 87d and 91d, respectively. The carriage section 41 is then lowered to seat the elements 63 and 67 in grooves 87d and 91d, respectively. If the tooth 85 intermediate the grooves 87c and 87d has the correct lead, the standard 71 will not be moved along the shaft 73, and the indicator 81 will provide a zero reading. However, if the lead is too great, the standard 71 will be moved to the right, thereby providing a positive reading on the indicator 81. The indicator 81 provides a direct reading of the distance the standard 71 moves along the shaft 73, and this is also a direct reading of lead error. Thus, it is not necessary to calculate the lead error. Conversely, if the lead is too small, the standard 71 is moved to the left and the indicator provides a negative reading directly indicative of the lead error. The lead error of each of the threads 27 of the nut 25 can be similarly checked. By loosening the clamp 35 and turning the nut 25 through a partial revolution, the lead error at other circumferential locations of the threads 27 can similarly be checked.

As shown in FIG. 5, each tooth 85 is defined by sloping surfaces 93 and 95. Each of the surfaces 93 and 95 should form a predetermined angle $x$ with the center line 97 of the nut 25. The angle of each of the surfaces 93 and 95 can be compared to the angle of the corresponding surfaces of the grooves 75 on the standard 71.

The angle $x$ is another characteristic which can be checked by the gage 11. This is accomplished by comparing the angle $x$ with the corresponding angle of the standard 71.

To check the angle $x$, the elements 63 and 67 are positioned in the appropriate grooves such as the grooves 87c and 91c, respectively. The thumbscrew 70 is tightened to fix the element 67 relative to the carriage section 41, and the indicator is zeroed. The standard 71 should be spaced from the retainer 77 and the leg 17 so that it can be freely moved along the shaft 73.

The carriage section 41 is then moved upwardly to the right with the element 63 sliding along the surface 93. Thus the path of movement of the carriage section 41 is controlled by the angle of the surface 93. The element 67 slides along the corresponding surface of the corresponding tooth of the standard 71. Any differences in the angle $x$ and the corresponding angle of the standard 71 results in movement of the standard and a reading on the indicator 81.

In conducting this angle check, care must be taken to assure that the region of engagement between the element 63 and the surface 93 moves with movement of the element 63.

Stated differently, if the element 63 is wide relative to the groove 87c, it may "hang up" or be supported near the top of the surface 93 throughout the angle check, in which event an accurate check is not obtained. To assure an accurate angle test, the element 63 is preferably much narrower than the groove 87c so that initially the region of engagement between the element 63 and the surface 93 is near the bottom of the groove 87c.

Another characteristic of the threads 27 which can be checked with the gauge 11 is the drunkenness of the threads, i.e., the waviness of the threads in a circumferential direction. To accomplish this, the clamp 35 is removed, and the nut 25 is turned on the finger 29. The finger 29 is stationary relative to the supporting structure 13 and, accordingly, the nut 25 translates relative to the finger 29 and the element 63. If the circumferential path of the threads 27 is true, the element 63 and the carriage 37 will remain stationary relative to the supporting structure. However, the element 63 and the carriage 37 will be moved along the shafts 39 to the extent of any circumferential waviness of the surfaces 93 and 95.

More specifically, the portion of the threads 27 in engagement with the threads of the finger 29 control the rate of translation of the nut 25 per increment of nut rotation, and the portion of the threads 27 which engage the element 63 controls the movement of the element 63. So long as the portions of the threads 27 engaging the finger 29 and the element 63 follow identical circumferential paths, the element 63 will not be relative to the supporting structure 13. However, any deviation in these circumferential paths causes the element 63 and the carriage 37 to move relative to the supporting structure 13, and the amount of such movement can be read directly on the indicator 81.

The standard surface of the standard 71 can be of various configurations. For example, the grooves 75 could define perfectly sized and shaped screw threads. However, each of the grooves 75 preferably defines a plane or zone which is perpendicular to the axis of the shaft 73. One advantage of this construction is that it is easier to very accurately make the grooves 75 than the screw threads. Another advantage of the circular grooves 75 is that the reading on the indicator 81 is independent of the angular position of the standard 71 relative to the shaft 73. If the grooves 75 defined screw threads, the standard 71 would have to be fixed against rotation relative to the shaft 73. In either event, a different standard must be used for each size of the threads 27.

The use of various spatial orientation terms herein such as horizontal, vertical, upper, lower, etc., should not be considered limiting inasmuch as the gage 11 can be used in different special orientations. To this end, a spring 99 may be employed between the upper wall 49 and the carriage 41 so as to bias the carriage section 41 away from the shaft 39.

Although an exemplary embodiment of the invention has been shown and described, many changes, modifications and substitutions may be made by one having ordinary skill in the art without necessarily departing from the spirit and scope of this invention.

I claim:

1. A gage for checking at least one characteristic of the threads of a threaded member comprising:
   a supporting structure;
   means for mounting the threaded member on said supporting structure, said threaded member having threads which are to be checked;
   a second member having a standard surface defining precisely the characteristic which is to be checked;
   means for mounting said second member on said supporting structure, one of said members being mounted for movement in a first direction relative to the other of the members and the supporting structure;
   a carriage;
   means for mounting said carriage on said supporting structure for movement relative to said members and said supporting structure;
   first and second elements carried by said carriage and adapted to engage the threads of the threaded member and said standard surface of the second member, respectively, the distance between said elements being fixable at least in a direction parallel to the direction of movement of said carriage;
   said carriage being movable to move the first and second elements into engagement with a plurality of locations on the threads and said standard surface, respectively, whereby said characteristic of the threads can be compared to said standard surface and any error in said characteristic of the threads is made manifest by movement of said one member in said first direction; and
   said one member being said second member, said gage including an indicator carried by said supporting structure and responsive to said movement of said second member in said first direction to provide an indication of said error in said characteristic.

2. A gage is defined in claim 1 wherein at least a portion of said carriage is movable toward and away from the second member and said gage includes means for urging said portion of said carriage toward said second member.

3. A gage as defined in claim 1 wherein said mounting means mounts the second member for generally linear movement and said movement of said second member in said first direction is generally linear.

4. A gage as defined in claim 1 wherein said standard surface includes a plurality of annular grooves.

5. A gage as defined in claim 4 wherein said mounting means for said second member mounts the second member for rotation.

6. A gage as defined in claim 1 wherein said standard surface includes a plurality of annular grooves, said mounting means mounts said second member for rotation and for movement generally parallel to the direction of movement of said carriage, said one member is said second member.

7. A gage for checking the lead of the threads of a threaded member comprising:
   a supporting structure;
   a carriage;
   first and second elements mounted on said carriage;
   means for mounting said carriage on said supporting structure for movement relative thereto along a predetermined path, the distance between said elements in a direction parallel to said path being fixable;
   means for mounting the threaded member on the supporting structure with the threads thereof extending generally transverse to said path, said first element being cooperable with the threads of said threaded member;
   a standard member having a standard surface including a plurality of grooves, said second element being cooperable with said grooves of said standard member; and
   means for mounting the standard member on the supporting structure for movement relative to said supporting structure in a direction generally parallel to said path, the threaded member being holdable against movement relative to said supporting structure in a direction generally parallel to said path whereby error in the lead of the threads imparts movement in said direction to said standard.

8. A gage as defined in claim 7 wherein at least a portion of said carriage is movable in a direction generally perpendicular to said path to facilitate cooperation between standard surface, respectively.

9. A gage as defined in claim 7 wherein said second element is mounted for movement along a second path relative to said carriage toward and away from the standard member, means for biasing the second element toward said standard member, releasable means for fixing said second element in any one of a plurality of positions along said second path, and an indicator driven by said standard member, said indicator being carried by said supporting structure for providing a visual indication of any error in the lead of the threads.

10. A gage as defined in claim 7 wherein said mounting means for said standard member mounts said standard member for rotation about an axis extending generally parallel to said predetermined path.

11. A gage as defined in claim 7 wherein the threads of the threaded member are internal threads and said means for mounting the threaded member includes a screw adapted to cooperate with the internal threads, said screw being configured to make the internal threads accessible to said first element.

12. A gage for checking at least one characteristic of the threads of a threaded member comprising:

a supporting structure;

means for mounting the threaded member on said supporting structure, said threaded member having threads which are to be checked;

a second member having a standard surface defining precisely the characteristic which is to be checked;

means for mounting said second member on said supporting structure, one of said members being mounted for movement in a first direction relative to the other of the members and the supporting structure;

a carriage;

means for mounting said carriage on said supporting structure for movement relative to said members and said supporting structure;

first and second elements carried by said carriage and adapted to engage the threads of the threaded member and said standard surface of the second member, respectively, the distance between said elements being fixable at least in a direction parallel to the direction of movement of said carriage;

said carriage being movable to move the first and second elements into engagement with a plurality of locations on the threads and said standard surface, respectively, whereby said characteristic of the threads can be compared to said standard surface and any error in said characteristic of the threads is made manifest by movement of said one member in said first direction; and said first and second elements being fixed relative to each other in the direction of movement of said carriage.

\* \* \* \* \*